United States Patent

Yoshida et al.

[11] Patent Number: 5,988,751
[45] Date of Patent: Nov. 23, 1999

[54] VEHICLE SEAT

[75] Inventors: Tomonori Yoshida, Yokohama; Moriyuki Eguchi, Kanagawa, both of Japan

[73] Assignee: Ikeda Bussan Co., Ltd., Ayase, Japan

[21] Appl. No.: 09/146,437

[22] Filed: Sep. 3, 1998

[30] Foreign Application Priority Data

Sep. 19, 1997 [JP] Japan .................................. 9-273846

[51] Int. Cl.⁶ .................................................. B60N 2/02
[52] U.S. Cl. ..................................... 297/367; 297/354.12
[58] Field of Search ................................ 297/344.1, 356, 297/366, 367, 370, 373, 354.12; 248/429

[56] References Cited

U.S. PATENT DOCUMENTS

| 4,076,309 | 2/1978 | Chekirda et al. . |
| 4,184,714 | 1/1980 | Courtois . |
| 5,161,856 | 11/1992 | Nishino . |
| 5,590,931 | 1/1997 | Fourrey et al. . |
| 5,692,589 | 12/1997 | Beguin . |
| 5,727,846 | 3/1998 | Yoshida .................................. 297/373 |
| 5,857,746 | 1/1999 | Barrere et al. . |

FOREIGN PATENT DOCUMENTS

| 63-65327 | 12/1988 | Japan . |
| 7-136032 | 5/1995 | Japan . |
| 9-28496 | 2/1997 | Japan . |
| 9-131237 | 5/1997 | Japan . |
| 2078850 | 1/1982 | United Kingdom .................. 297/367 |

Primary Examiner—Milton Nelson, Jr.
Attorney, Agent, or Firm—Foley & Lardner

[57] ABSTRACT

Each of a base member and a rotational arm is circular. A ring member is fixed to a peripheral edge of the base member. A peripheral edge of the rotational arm is covered by the ring member and one end of a return spring is engaged with a hook portion formed in the ring member. The other end of the return spring is engaged with fixing members such as bolts, nuts and rivets and so on. A peripheral edge of the nuts as the fastening members is formed in a guide portion for the return spring.

7 Claims, 6 Drawing Sheets

VEHICLE SEAT

BACKGROUND OF THE INVENTION

The present invention relates to a vehicle seat and more specifically to a vehicle seat comprising a back and forth slide mechanism comprising a fixed rail and a movable rail for supporting a seat cushion and a reclining apparatus comprising a base member fixed to said seat cushion, a rotational arm swingably supported by said base member and fixed to a seat back, a lock mechanism encased between said base member and said rotational arm, an operating lever unlocking said lock mechanism, a lock spring urging said operating lever to a locking direction and a return spring inclining the seat back forward.

Hitherto, a construction adjusting back and forth movement of a seat cushion by a back and forth slide mechanism is well known. Two reclining apparatuses inclining a seat back forward and rearward are described in Japanese Unexamined (KOKAI) Patent Publication No. 9 (1997)-28496 and Japanese Unexamined (KOKAI) Patent Publication No. 9 (1997)-131237 suggested by the present applicant. Japanese Examined (KOKOKU) Patent Publication No. 63 (1988)-65327 discloses a hinge apparatus for a reclining backrest capable of locking according to an adjusting position. Japanese Unexamined (KOKAI) Patent Publication No. 7 (1995)-136032 discloses a construction in which a cam is moved along only a sliding direction (up and down direction) of a pole in order to avoid an inferior connection by a dimension error of the pole and the cam.

The Japanese Unexamined (KOKAI) Patent Publication No. 9 (1997)-28496 discloses two reclining apparatuses in which a bulging portion is provided with a first cam portion for unlocking the cam portion of an inner side and a second cam portion for locking respectively, at a time of lock-off and lock-on, the bulging portion is engaged with a groove for lock-off of teeth inner and an abutment for lock-on, engagement and disengagement with outer teeth of teeth inner and inner teeth of an arm fixed to a seat back side and lock-off and lock-on are performed prior to the outer side.

A return spring is mounted in order to incline a seat back forward, the return spring is mounted on a free hinge side of one side lock because installation positions are few when each of a base member and a rotational arm is circular.

As shown in FIGS. 5 and 6, a reclining apparatus 10 comprising a base member 11 fixed to a movable rail side, a rotational arm 12 swingably supported by the base member 11 and fixed to a seat back side, a lock mechanism (not shown in the drawing) encased between said base member 11 and said rotational arm 12, an operating lever 15 unlocking said lock mechanism, a lock spring 35 urging the operating lever 15 to a locking direction and a return spring 45 inclining the seat back forward is well known.

One end 45a of said return spring 45 is engaged with a hook portion 34 formed in the rotational arm 12, the other end 45b of the return spring 45 is engaged with a hook bracket 47 formed in said base member 11, the hook bracket 47 is curvedly extended and is formed in a guide portion 51 for said return spring 45. The guide portion 51 produces a resilient force efficiently so that a smooth operation is gained.

In this conventional example, however, when each of the base member and the rotational arm is circular, installation positions of the return spring are few and it is difficult for two reclining apparatuses to fix the return spring. Especially when each of the base member and the rotational arm is circular, when the rotational arm is fixed to a lower portion of the side frame of the seat back frame by stud bolts, the return spring is forced to be positioned outside in order to avoid engagement with the stud bolts and thereby the reclining apparatuses become thick and it is necessary to mount parts when the angle limiting portion of the front and rear inclination of the seat back is formed, it is necessary to mount the guide portion to a hook bracket in order to gain a smooth operation of the return spring and thereby the number of parts increases and the manufacturing cost becomes high.

SUMMARY OF THE INVENTION

It is therefore an object of the present invention to provide a vehicle seat in which when each of a base member and a rotational arm is circular, it is easily possible to fix a return spring to a reclining apparatus, it is possible to make the thickness of the reclining apparatus thin, it is easily possible to construct an angle limiting portion of a front and rear inclination movement of a seat back, it is not necessary to mount a guide portion for the return spring to a hook bracket, it is possible to gain a smooth operation of the return spring, it is possible to decrease the number of parts and it is possible to gain an economically superior vehicle seat.

According to the present invention, a vehicle seat comprises:

a back and forth slide mechanism comprising a fixed rail and a movable rail for supporting a seat cushion;

a seat back member; and a reclining apparatus comprising a base member fixed to said movable rail, a rotational arm swingably supported by said base member and fixed to the seat back member by a fastening member, a lock mechanism encased between said base member and said rotational arm, an operating lever unlocking said lock mechanism, a lock spring urging said operating lever to a locking direction and a return spring inclining the seat back member forward;

wherein each of said base member and said rotational arm is circular, a ring member is fixed to a peripheral edge of said base member, said rotational arm comprising a peripheral edge covered by said ring member, said ring member comprising a hook portion for installing said return spring, said return spring comprising a first end engaged with the hook portion and a second end engaged with said fastening member and said fastening member guiding said return spring.

DETAILED DESCRIPTION OF THE INVENTION

The following is an explanation of a vehicle seat according to the present invention with reference to the drawings.

Figure 3:
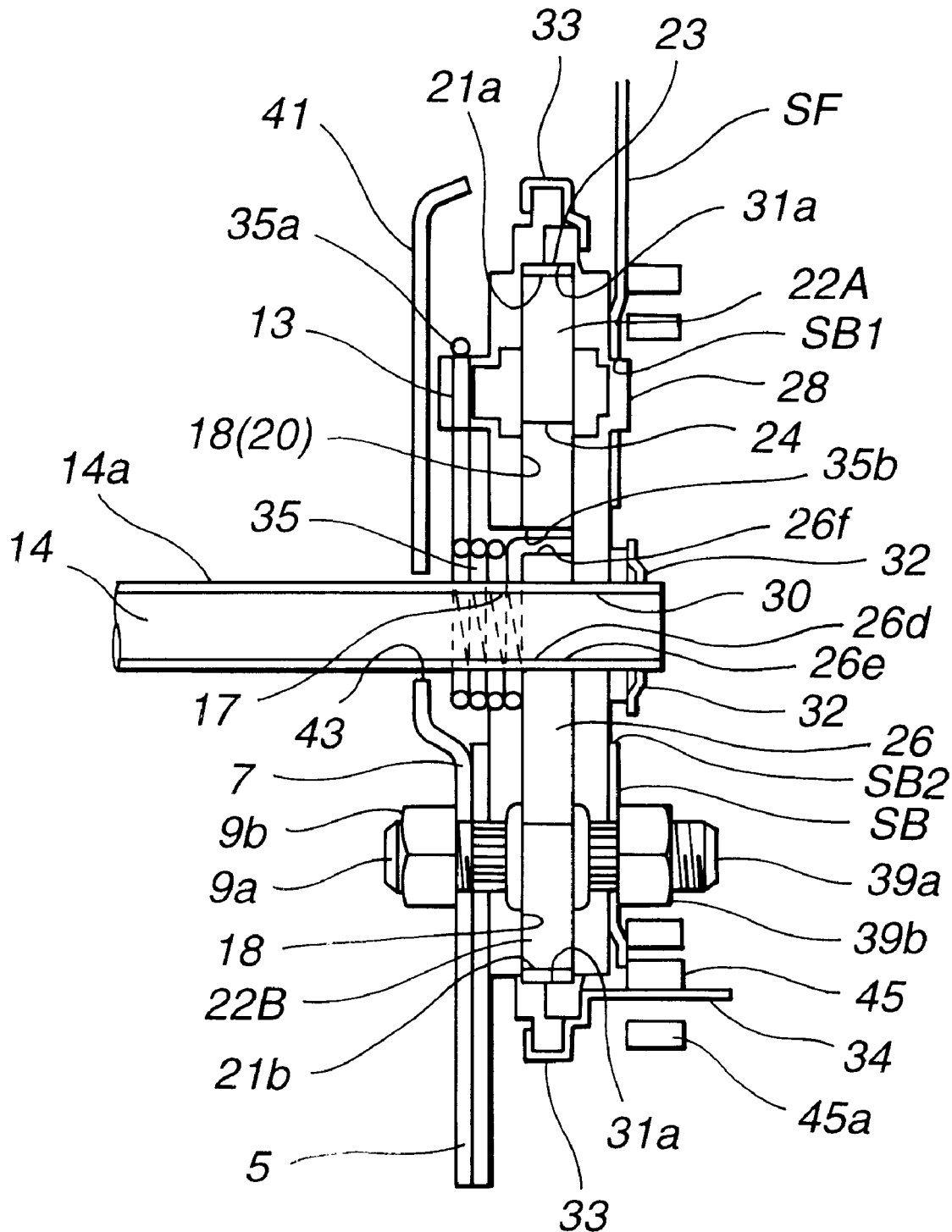
FIG. 3 is a sectional view taken along the line of III—III of FIG. 2 and shows the reclining apparatus of the vehicle seat according to the present invention.
Figure 4:
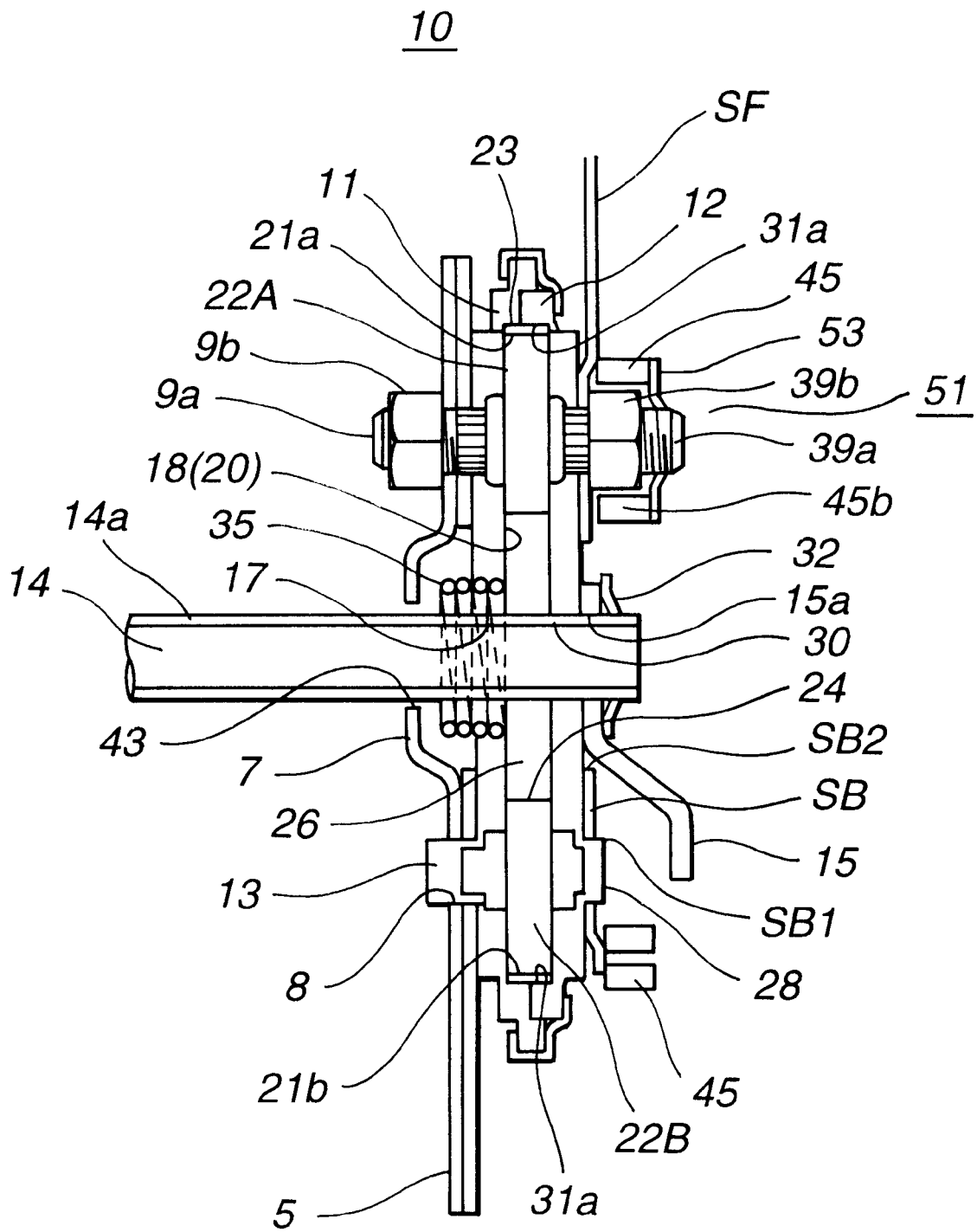
FIG. 4 is a sectional view taken along the line of IV—IV of FIG. 2 and shows the reclining apparatus of the vehicle seat according to the present invention.
Figure 5:
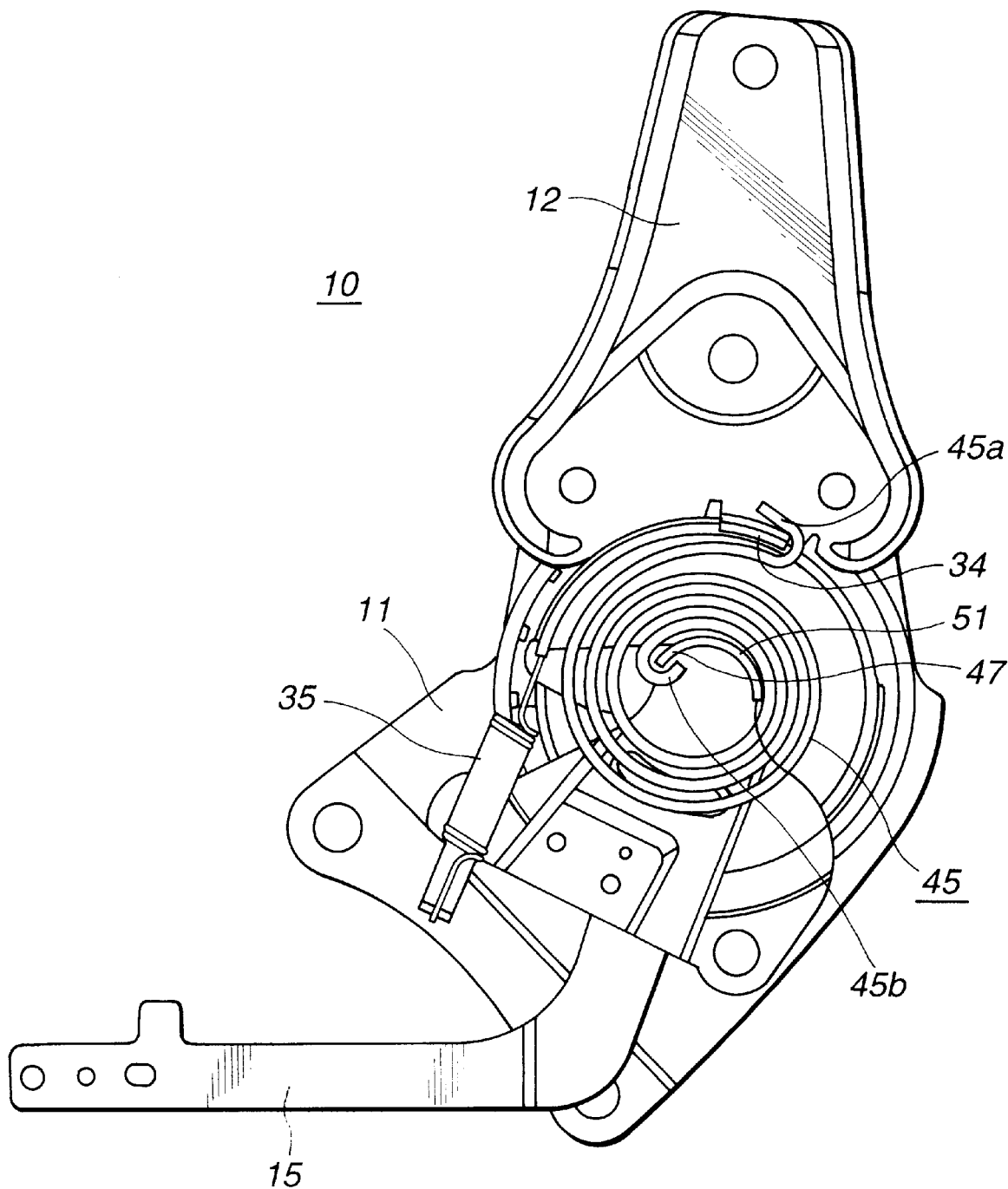
FIG. 5 is a front view of a reclining apparatus according to a conventional vehicle seat.
Figure 6:
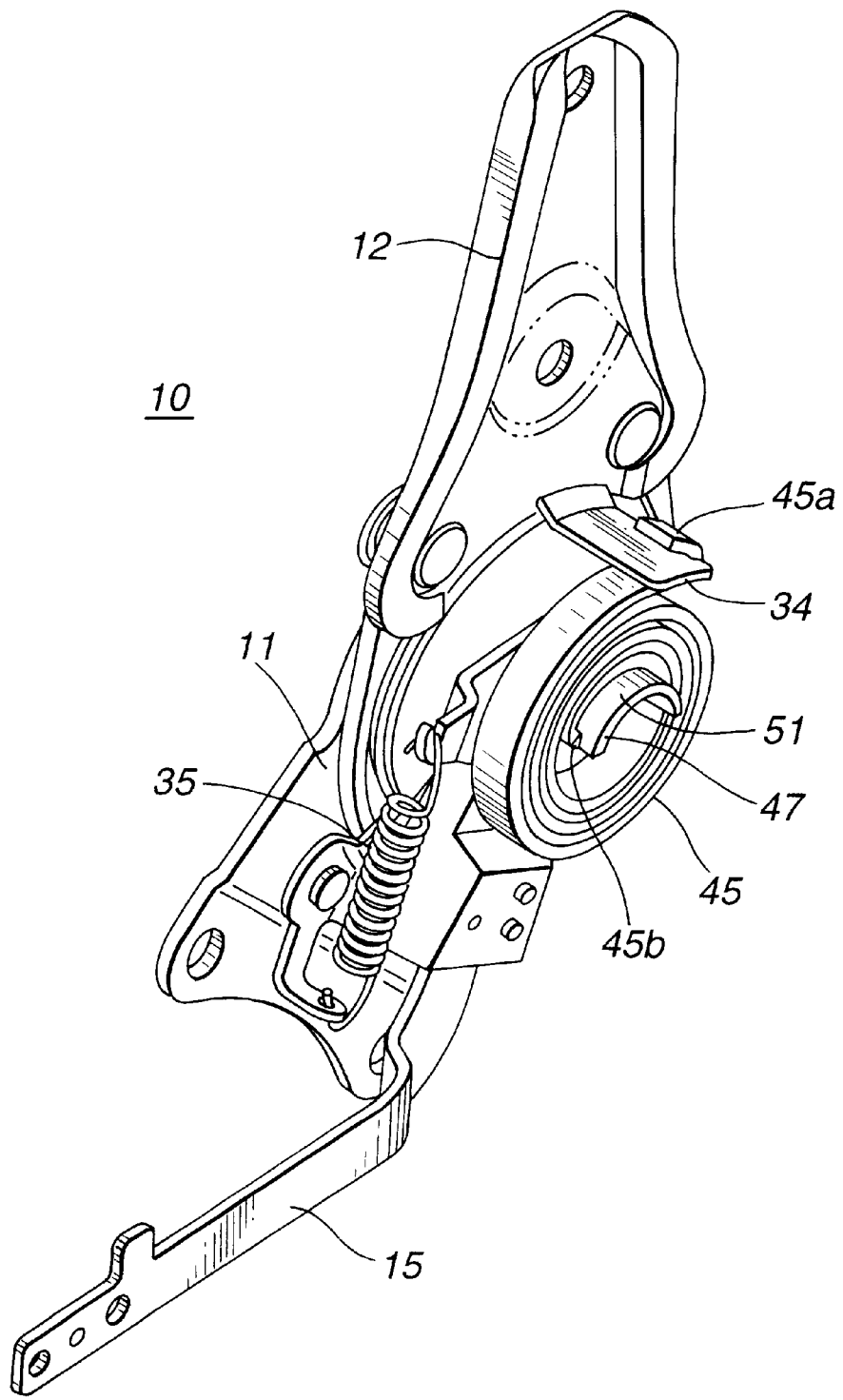
FIG. 6 is a perspective view of the reclining seat according to the conventional vehicle seat.

FIGS. 1 through 4 show an embodiment of a vehicle seat of the present invention. FIGS. 5 and 6 show an above-mentioned prior art. The parts of FIGS. 1 through 4 corresponding to the parts in FIGS. 5 and 6 have the same reference numerals and an explanation is performed by the same reference numerals.

The vehicle seat is mounted on a back and forth slide mechanism 1 so as to be back and forth movably adjustable.

Figure 1:
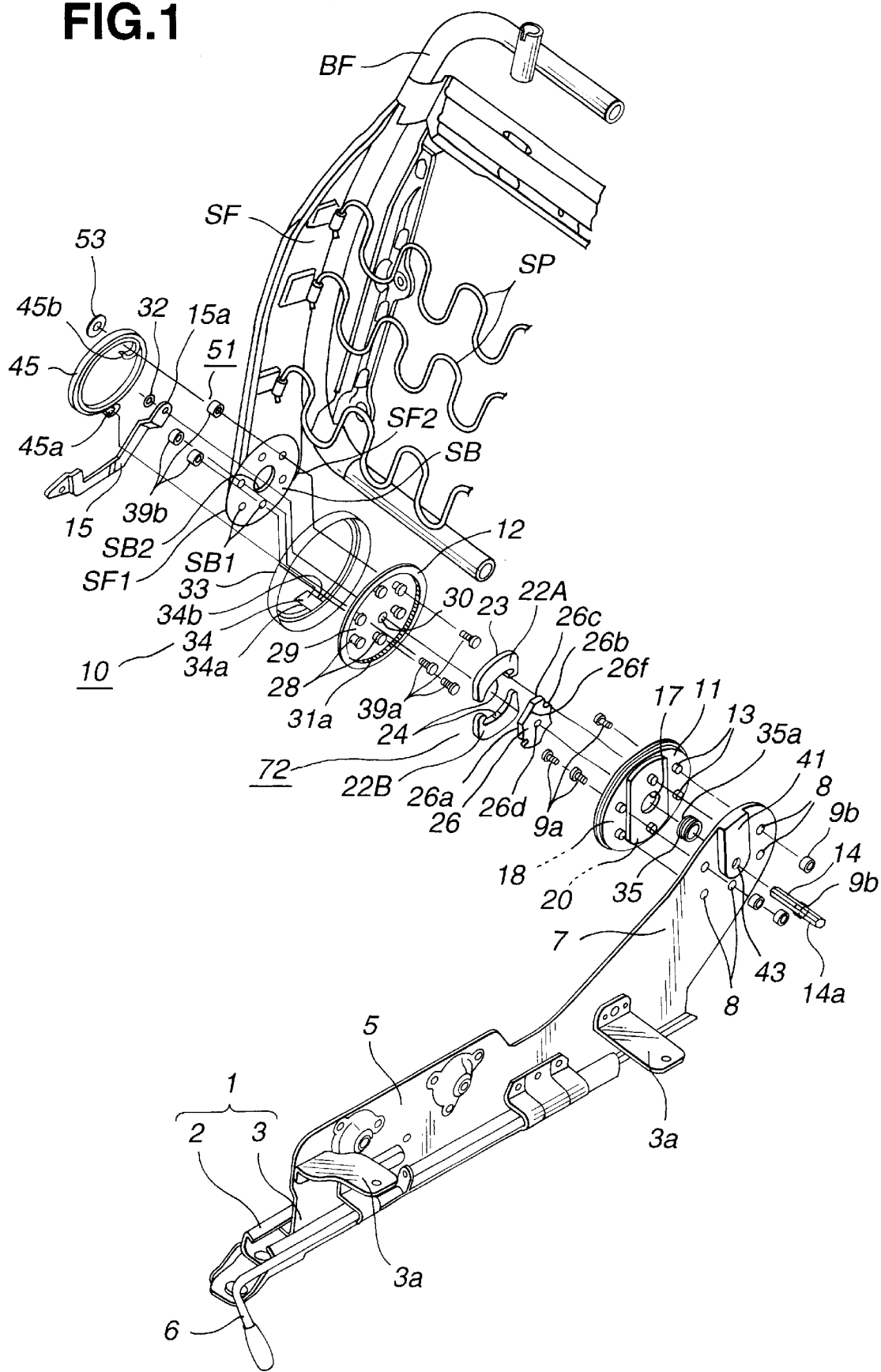
FIG. 1 is an exploded perspective view of one embodiment of a vehicle seat according to the present invention.

As shown in FIG. 1, the back and forth slide mechanism 1 comprises a fixed rail 2 and a movable rail 3. The movable rail 3 is fitted with the fixed rail 2 so as to be back and forth slidable and comprises a vertical plate portion 5. The basic construction of the back and forth slide mechanism 1 includes a conventional construction and includes a construction in which a lock mechanism is operated by an operating lever 6. A seat cushion frame (not shown in the drawing) is mounted on the fixed bracket 3a of the movable rail 3.

The vertical plate portion 5 of the movable rail 3 projects obliquely and rearward and a reclining apparatus 10 is mounted on a projecting portion 7 positioned in the rear of the vertical plate portion 5. The reclining apparatus 10 comprises a circle-shaped base member 11 and a circle-shaped rotational arm 12. The base member 11 is mounted on the projecting portion 7. The rotational arm 12 is mounted on left and right side frames SF (only one side is shown) of a seat back frame BF. S-shaped seat springs SP are arranged between side frames SF so as to be positioned in an appropriate interval in a vertical direction.

A plurality of engaging convex portions 13 are formed in the base member 11 confronting the movable rail 3. A plurality of through openings 8 as a plurality of engaging concave portions are formed in the movable rail 3 confronting a plurality of engaging convex portions 13. The through openings 8 are fitted and fixed with the engaging convex portions 13.

The base member 11 is mounted on the projecting portion 7 of the movable rail 3 by bolts 9a such as stud bolts and nuts 9b in such a manner that the engaging convex portions 13 are fitted with the through openings 8 as the engaging concave portions. A side bracket SB is formed in a lower portion of the side frames SF. The side bracket SB fastens the circle-shaped rotational arm 12.

The rotational arm 12 is rotatably supported by the base member 11 around a pivot 14 as a rotational axis fixed to an operating lever 15. As shown in FIGS. 3 and 4, a center opening 17 through which the pivot 14 passes is formed in a center portion of the base member 11 mounted on the projecting portion 7 of the vertical plate portion 5 of the movable rail 3 and the center opening 17 is formed in a center position of a circular concave portion 18.

Figure 2:
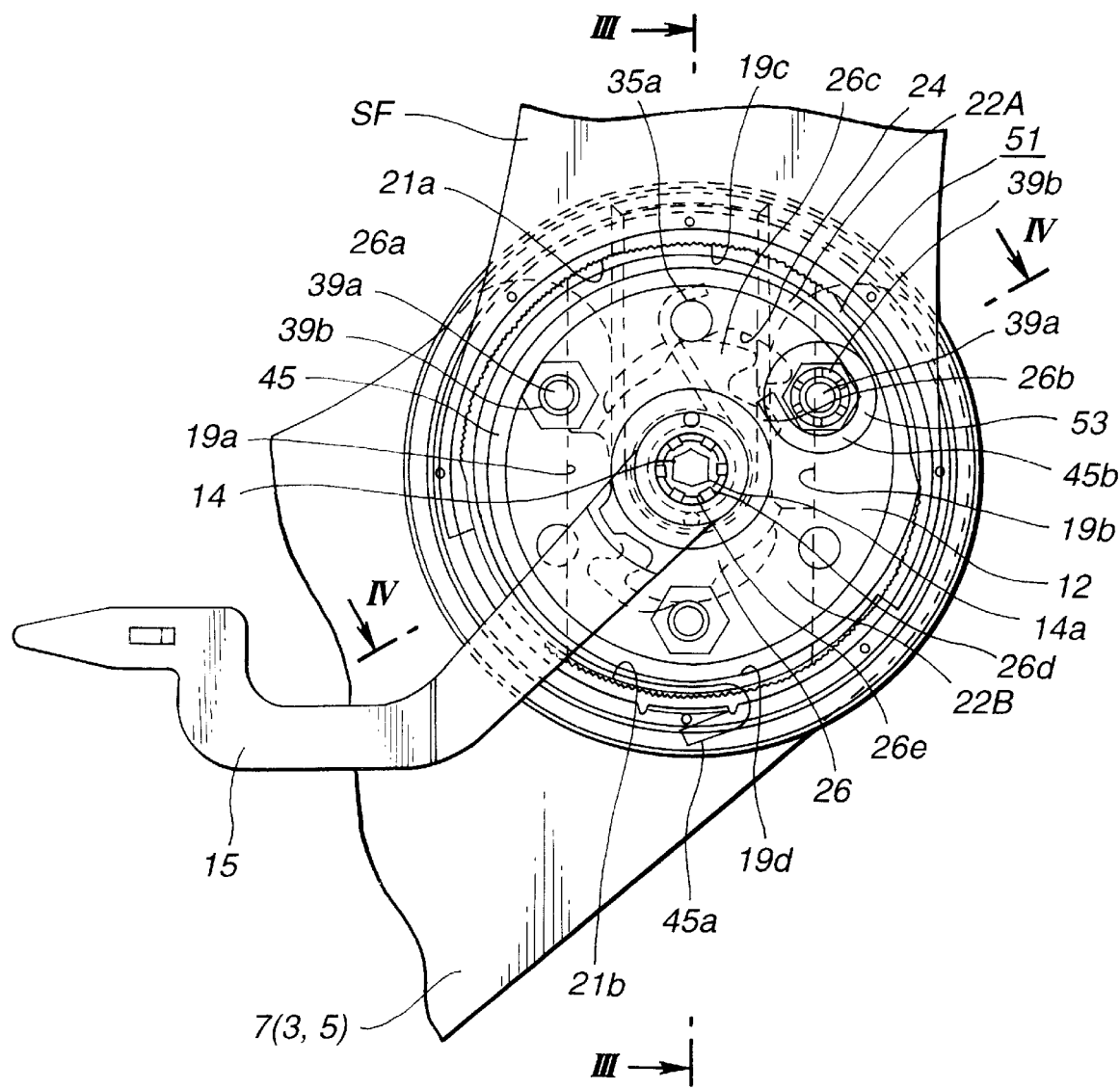
FIG. 2 is an enlarged front view of a reclining apparatus of the vehicle seat according to the present invention.

As shown in FIGS. 2 and 3, a substantially rectangle-shaped concave portion 20 is formed in the circular concave portion 18. The concave portion 20 is formed by a pair of left and right guide side walls 19a and 19b extending vertically and circle-shaped side walls 19c and 19d connected with the guide side walls 19a and 19b. Upper and lower engaging teeth portions 21a and 21b engaging with inner tooth members 22A and 22B are formed in the circle-shaped side walls 19c and 19d.

A pair of upper and lower inner tooth members 22A and 22B as sliding engaging members are movably arranged radially in the substantially rectangle-shaped concave portion 20. The inner tooth members 22A and 22B are guided by the guide side walls 19a and 19b. As shown in FIGS. 1 and 3, cam surfaces 24 are formed in the inner circumference side of the inner tooth members 22A and 22B.

A cam 26 is arranged between the inner tooth members 22A and 22B of the concave portion 20. The cam 26 is fitted with the pivot 14 and is rotated. As shown in FIG. 2, the cam 26 comprises engaging portions 26a and 26b and a convex portion 26c. The engaging portions 26a and 26b abut with both sides of the cam surfaces 24 of each of the inner tooth members 22A and 22B. The convex portion 26c projects outwardly and is formed between the engaging portion 26a and the engaging portion 26b. A center opening 26d is formed in the cam 26. The pivot 14 passes through the center opening 26d.

When the pivot 14 as a rotational axis of the operating lever 15 is used as two reclining apparatuses, the pivot 14 is formed as a connecting rod connecting the cams 26 (one side is not shown) of an inner side and an outer side reclining devices. The pivot 14 is non-circular in section.

A plurality of projecting ridges 14a are formed in the pivot 14 and the projecting ridges 14a are engaged with a plurality of concave grooves 26e. The projecting ridges 14a extend along an axis direction of an outer circumference of the pivot 14. The concave grooves 26e are formed in the center opening 26d of the cam 26.

As shown in FIGS. 1 through 4, the rotational arm 12 is circular. A plurality of engaging convex portions 28 are formed along an inner side of a peripheral edge of the rotational arm 12. The rotational arm 12 is fixed by bolts 39a such as stud bolts and nuts 39b in such a manner that the engaging convex portions 28 are fitted with openings SB1 formed as concave portions in the side bracket SB of a lower portion of the left and right side frames SF. It is also possible that fastening members such as rivets are used instead of bolts 39a and nuts 39b. A center opening SB2 is formed in the side bracket SB. The center opening SB2 receives the pivot 14.

A cylindrical concave portion 29 is formed in the rotational arm 12. The radius of the concave portion 29 is the same as the radius of the circular side walls 19c and 19d of the concave portion 20 of the base member 11. A center opening 30 is formed in the center portion of the concave portion 20. The center opening 30 receives the pivot 14. Internal teeth 31a are formed in the inner wall forming the concave portion 29. The internal teeth 31a engage with external teeth 23 of the inner tooth members 22A and 22B.

As shown in FIGS. 3 and 4, the base member 11 and the rotational arm 12 are fixed by a snap ring 32 in such a manner that the pivot 14 passes through the center opening 17 of the base member 11, the center opening 26d of the cam 26, the center opening 30 of the rotational arm 12 and the opening 15a of the operating lever 15.

A ring member 33 is fixed to the base member 11. The ring member 33 covers the peripheral edge of the rotational arm 12. The ring member 33 prevents the base member 11 and the rotational arm 12 from separating.

A lock spring 35 is a coil spring. The lock spring 35 surrounds the outer circumference of the pivot 14, the lock spring 35 is arranged in the center opening 17 of the base member 11, one end 35a of the lock spring 35 is engaged with the engaging convex portion 13 of the base member 11 and the other end 35b is engaged with a pawl portion 26f formed in the cam 26.

The lock spring 35 urges the cam 26, the pivot 14 and the operating lever 15 toward a counterclockwise direction in FIGS. 1 and 2. A plurality of lock springs 35 can be arranged. As shown in FIG. 1, a cover portion 41 covering the lock spring 35 of the reclining apparatus 10 is formed in the projecting portion 7. The projecting portion 7 is projects obliquely and rearward in the vertical plane portion 5 of the movable rail 3.

A through hole 43 is formed in the cover portion 41. The through hole 43 receives the pivot 14 as a rotational axis of the operating lever 15. The lower portion of the cover portion 41 is formed in a circular shape around the through hole 43. Both side portions of the cover portion 41 are formed in a substantially U-shaped box extending upwardly in parallel with each other.

A hook portion 34 is formed in a part of the peripheral edge of the ring member 33. An outside end 45a as one end of a return spring 45 is engaged with the hook portion 34. An inside end 45b as the other end of the return spring 45 is engaged with the nuts 39b as fastening members of the side bracket SB of the lower portion of the side frames SF. A snap ring 53 is mounted in the end portion of the bolts 39a and thereby prevents the disengagement of the inside end 45b of the return spring 45. The return spring 45 is wound around the outside of the fastening members such as the nuts 39b.

When the bolts 39a are screwed from the opposite side, the inside end 45b as the other end of the return spring 45 can be engaged with the peripheral edge of the bolts 39a and can be engaged with the fastening members such as the rivets instead of the bolts 39a and the nuts 39b. The inside end 45b can be engaged with the bolts 39a and the nuts 39b by inserting a ring preventing the bolts 39a and the nuts 39b from loosening.

The peripheral edge of the nut 39b as the fixing member is formed in a guide portion 51 for the return spring 45. Front and rear end portions of the hook portion 34 of the ring member 33 is formed in front and rear limiting portions 34a and 34b of front and rear rotational angle of the side frames SF of the seat back frame SB.

When the side frames SF are inclined forward, a front end portion SF1 of the lower end of the side frames SF is engaged with the front limiting portion 34a of the hook portion 34 and a front inclination rotational angle is limited. When the side frames SF are inclined rearward, a rear end portion SF2 of the lower end of the side frames SF is engaged with the rear limiting portion 34b of the hook portion 34 and a rear inclination rotational angle is limited.

In the present embodiment, a case of a pair of inner tooth members 22A and 22B is explained. However, the present invention is not limited to a pair of inner tooth members 22A and 22B. It is possible to mount more than two pairs of inner tooth members in a predetermined angle interval.

The shapes of the base member 11, the rotational arm 12, the operating lever 15, the inner tooth members 2A and 22B and the cam 26 are not limited to the present embodiment. It is possible to set optional shapes.

According to a vehicle seat, because each of a base member and a rotational arm is circular, a ring member is fixed to a peripheral edge of said base member, a peripheral edge of said rotational arm is covered by the ring member, one end of a return spring is engaged with a hook portion formed in said ring member, the other end of the return spring is engaged with a fastening member fixed to a lower portion of a side frame of a seat back frame and the fastening member is formed in a guide portion for said return spring, it is possible to make a thickness of a reclining apparatus thin, it is not necessary to mount a guide portion of the return spring in a hook bracket and it is possible to easily mount the return spring.

According to a vehicle seat, because each of a base member and a rotational arm is circular, a ring member is fixed to a peripheral edge of said base member, a peripheral edge of said rotational arm is covered by the ring member, one end of a return spring is engaged with a hook portion formed in said ring member, the other end of the return spring is engaged with fastening members such as the bolts, the nuts and the rivets fixed to a lower portion of a side frame of a seat back frame and the peripheral edge of the fastening members is formed in a guide portion for said return spring, it is possible to make a thickness of a reclining apparatus thin, it is not necessary to mount a guide portion of the return spring in a hook bracket and it is possible to easily mount the return spring.

According to a vehicle seat, because each of a base member and a rotational arm is circular, a ring member is fixed to a peripheral edge of said base member, a peripheral edge of said rotational arm is covered by the ring member, one end of a return spring is engaged with a hook portion formed in said ring member, the other end of the return spring is engaged with fastening members fixed to a lower portion of a side frame of a seat back frame, the peripheral edge of the fastening members is formed in a guide portion comprising said return spring and front and rear end portions of the hook portion of said ring member are formed in front and rear limiting portions of a rotational angle of a seat back, it is possible to make a thickness of a reclining apparatus thin, it is not necessary to mount a guide portion for the return spring in a hook bracket and it is possible to easily mount the return spring and because angle limiting portions of front and rear inclining movement of the seat back are formed by front and rear end portions of the hook portion of the ring member, it is possible to make a construction easy and it is possible to decrease the number of parts.

According to the present invention, when each of a base member and a rotational arm is circular, it is easily possible to mount a return spring to a reclining apparatus, it is possible to make a thickness of the reclining apparatus thin, it is easily possible to construct an angle control of front and rear inclining movement of a seat back, it is not necessary to mount a guide portion of the return spring in a hook bracket, it is possible to gain a smooth operation of the return spring, it is possible to decrease the number of parts and it is possible to gain an economically superior vehicle seat.

What is claimed is:

1. A vehicle seat comprising:
    a back and forth slide mechanism comprising a fixed rail and a movable rail for supporting a seat cushion;
    a seat back member; and
    a reclining apparatus comprising a base member fixed to said movable rail, a rotational arm swingably supported by said base member and fixed to the seat back member by a fastening member, a lock mechanism encased between said base member and said rotational arm, an operating lever unlocking said lock mechanism, a lock spring urging said operating lever to a locking direction and a return spring inclining the seat back member forward;
    wherein each of said base member and said rotational arm is circular, a ring member is fixed to a peripheral edge of said base member, said rotational arm comprising a peripheral edge covered by said ring member, said ring member comprising a hook portion for installing said return spring, said return spring comprising a first end engaged with the hook portion and a second end engaged with said fastening member and said fastening member guiding said return spring.

2. A vehicle seat as claimed in claim 1 wherein said fastening member is one of a bolt, a nut and a rivet.

3. A vehicle seat as claimed in claim 1 wherein said seat back member comprises a seat back frame comprising a side frame member, the rotational arm is fixed to a lower portion of said side frame member by a plurality of said fastening members arranged in a circle, and said return spring is wound around said fastening members.

4. A vehicle seat as claimed in claim 1 wherein said hook portion comprises front and rear limiting portions for limiting a rotational angle of a side frame member of said seat back member.

5. A vehicle seat as claimed in claim 4 wherein said side frame member comprises a front end portion abutting on said front limiting portion when said side frame member inclines forward and a rear end portion abutting on said rear limiting portion when said side frame member inclines rearward.

6. A vehicle seat as claimed in claim 1 wherein said reclining apparatus further comprises a pivot passing through a center opening of said base member, a center opening of said lock mechanism, a center opening of said rotational arm, and an opening of said operating lever.

7. A vehicle seat as claimed in claim 1 wherein said base member comprises a circular concave portion comprising a substantially rectangular concave portion.

* * * * *